F. E. MILLS.
PRESSURE TRANSMITTING CONTROLLER.
APPLICATION FILED MAR. 16, 1915.

1,246,298.

Patented Nov. 13, 1917.

Witnesses.
Franklin E. Low
Beatrice L. Smith

Inventor
Francis E. Mills.
by his Atty Robt H. Hains

UNITED STATES PATENT OFFICE.

FRANCIS E. MILLS, OF BOSTON, MASSACHUSETTS.

PRESSURE-TRANSMITTING CONTROLLER.

1,246,298.　　　　　　　Specification of Letters Patent.　　Patented Nov. 13, 1917.

Application filed March 16, 1915. Serial No. 14,872.

*To all whom it may concern:*

Be it known that I, FRANCIS E. MILLS, a citizen of the United States, residing in Boston, county of Suffolk, and State of Massachusetts, have invented an Improvement in Pressure-Transmitting Controllers, of which the following description, in connection with the accompanying drawings, is a specification, like letters on the drawings representing like parts.

The invention to be hereinafter described relates to pressure transmitting controllers, and more particularly to controllers of the general character disclosed by the patent to Mills & Mills, No. 1,136,748, April 20, 1915.

In the application mentioned, there was shown and described a pressure-transmitting controller for automatically determining or regulating the fluid pressure transmitted from a source of pressure supply to a receiver or container, such, for instance, as an automobile tire; and broad claims were directed to the general features of the invention. The device of said application was found to be well adapted to its purpose in practice, and pressure could be safely transmitted to an automobile tire by its use. The present invention is a further development of certain features of said device, and is particularly directed to improvements thereof, which will best be made clear from the following description and accompanying drawing of one embodiment of the said improvements.

In the drawings:—

While the invention is shown as associated with tire inflating means, and while the following descriptiotn will set forth its use in exploitation of the invention, it is to be understood that the invention may be employed to automatically determine the pressure that will be transmitted to any receptacle into which it is desired to deliver a predetermined pressure. In the illustrated form of the invention, however, certain features are peculiarly adapted to the use of the device of the present invention for the inflation of pneumatic tires, as will more fully appear.

Figure 1:
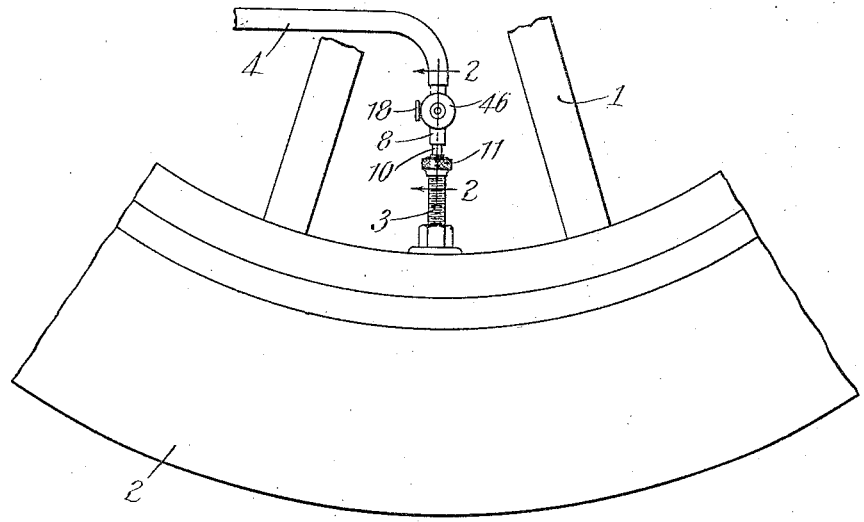
Figure 1 is a side view, showing portions of a wheel with a pneumatic tire thereon, and connections between a source of air pressure supply and the valve cylinder of the tire with the present invention interposed in said connections.

The wheel 1 to which the pneumatic tire 2 may be applied, as indicated in Fig. 1, may be of any usual character and the tire may be secured thereon in any desired way. As well known by those skilled in the art, pneumatic tires are each provided with a valve cylinder 3 which projects through a portion of the wheel rim and contains the usual valve held to its seat by the pressure of the air within the tire. These features may all be as usual, and being well understood by those skilled in the art, need no further explanation. In order to inflate the pneumatic tire, the valve cylinder 3 is usually connected by a flexible tube 4 to a source of fluid or air pressure, such as a reservoir of compressed air or a pump. In the absence of some means to prevent undue inflation of the tire, it will be clear that unless the attendant is careful and watchful of the air inflow, serious injury may be done the tire by overinflation, or the tire may not be inflated to the desired predetermined extent. In this latter case, as will be readily understood, the tire is more readily susceptible to punctures.

To overcome both of the above difficulties, the present invention contemplates the interposition of improved means between the source of fluid pressure and the tire or other receptacle, which, when the tire or receptacle has been inflated to the desired predetermined amount, will automatically stop further inflow of air thereto.

Figure 2:
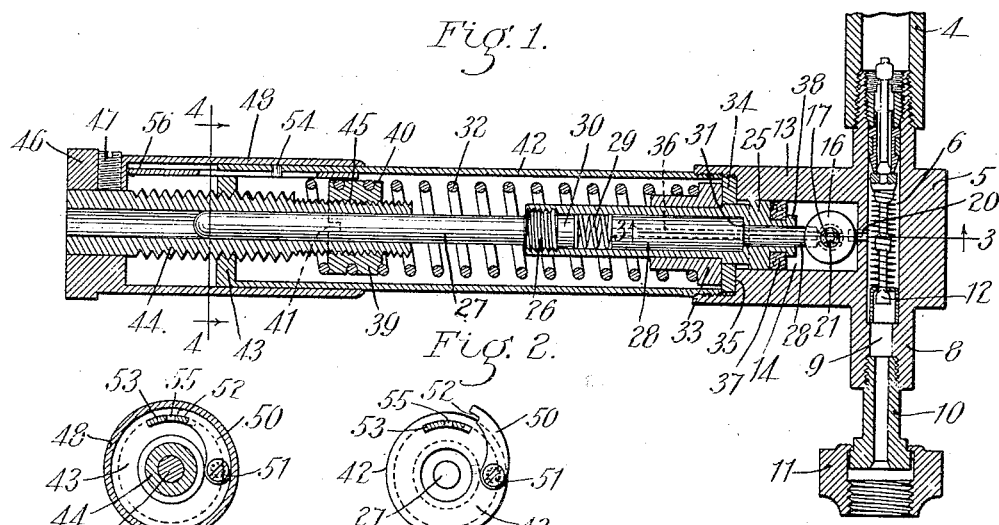
Fig. 2 is an enlarged sectional view, substantially on the line 2—2, of Fig. 1.
Figure 3:
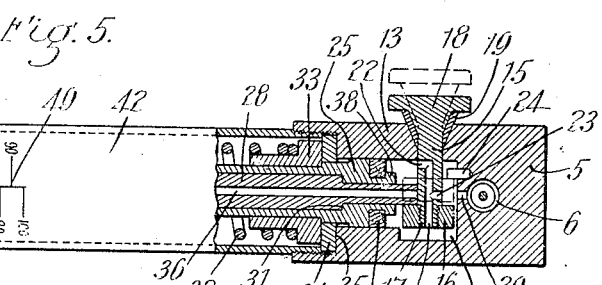
Fig. 3 is a side elevation and part section on the line 3—3 of Fig. 2, and at right angles to the section of Fig. 2.

The head 5, Figs. 2 and 3, having an air passageway 6, to which, when desired, may be connected the tube 4 leading from the source of supply, and the extension 8 having the passageway 9, may be of any desired form or character, and are conveniently illustrated as being like the similar parts in said prior application. To the extension 8 is secured the tube 10 having the usual coupling adapted to appropriately connect the passageway through the head with the valve cylinder 3 of the pneumatic tire or other receptacle. This same form of coupling connection may be employed to join the tube 4 with the head, as is well understood by those skilled in the art.

In the head 5, and appropriately located in the passageway 6, as illustrated in Fig. 2, there may, if desired, be employed a one-way valve 12, which will permit air to flow from the source of supply into the receptacle to be supplied, but will prevent back flow. There is nothing new in this valve construction, and it may be the same as usually employed in the valve cylinder 3 connected to the automobile tires.

The head 5 has a portion 13 in which is formed a valve chamber 14. This portion 13 may be appropriately formed and associated with the head 5, but is herein shown as being integral therewith, though this, of course, is not essential.

Movable in the chamber 14 is the valve 15, Fig. 3, having a head 16 which may be detachably secured to the stem of the valve by suitable means such as the screw threads 17, whereby the parts are adapted for convenient assemblage. The stem of the valve 15 extends through the wall of the portion 13, as indicated in Fig. 3, and in order to effectively produce an air-tight fit or joint between the surface of the valve and its seat, the outer portion 18 of the valve is preferably conical in form, and may be provided with a facing of yielding material 19, such as rubber or the like, the construction being such that when the valve 15 is in its closed position, as indicated by full lines, Fig. 3, an air-tight fit will be produced between the valve and its seat in the wall of the portion 13.

Connecting the passageway 6 with the valve chamber 14, is the inlet 20, whereby the air pressure produced in the passageway 6 and transmitted to the receptacle to be supplied, or the automobile tire, is likewise produced in the valve chamber 14. Extending longitudinally of the valve 15 is the vent or passageway 21, its end portion 22 being turned through the stem of the valve and adapted, when the valve is in its unseated position, as indicated by dotted lines, Fig. 3, to permit air to pass from the valve chamber to the exterior atmosphere. In order that the air in the valve chamber may be admitted to the vent or passageway 21, the stem of the valve is provided with a transverse opening 23, as indicated in Fig. 3, the construction being such that when the valve is in closed position, as indicated by full lines, Fig. 3, and is locked in such closed position, as will hereinafter appear, the air pressure in the passageway 6 will be transmitted with substantial uniformity to the valve chamber 14, and the vent or passageway 21 in the valve stem, so that the full air pressure is permitted to act upon the lower face of the head 16 of the valve as indicated in Fig. 3. From this construction, it will be apparent that should the valve be freed to movement at any time, the air pressure between the wall of the valve chamber and the head 16 will cause the valve 15 to move to its open or dotted line position, Fig. 3, and thereby relieve air or fluid pressure in the chamber 14. In order to limit the movement of the valve 15, a suitable stop 24 may be provided in the valve chamber.

As pointed out in the prior application to which reference has hereinbefore been made, the valve 15 which, for convenience, may be known as the relief valve, is locked in closed position under a yielding pressure of a spring or other suitable means, and is relieved from this locking control when the air pressure in the valve chamber has reached a predetermined amount. This operative relation of the relief valve and its lock as described in the said prior application, has been found to be practical and efficient in action, but when the relief valve was open, the full force of the locking spring was transmitted to the relief valve. It is one of the purposes of the present invention to avoid this stress upon the relief valve, and as one means to this end, the present invention contemplates providing the locking plunger or piston with a separate, yieldingly-mounted locking pin, one preferable form of construction of which will now be described.

Mounted for reciprocating movement in the chamber of the portion 13, as indicated in Fig. 2, is the locking plunger or piston 25 preferably made tubular in form, and having secured to one of its end portions at 26, the stem or guide portion 27. The connection between the tubular locking plunger or piston 15 and the stem 27 is preferably formed as a conical screw-threaded portion, whereby, when the parts are firmly associated together, they will form an air-tight joint. Mounted in the hollow locking plunger or piston 25 is the locking pin 28, the inner end portion of which is seated upon the end of a light spring 29, Fig. 2, interposed between a seat 30 and the inner end of said pin. A shoulder 31 limits the outward movement of the locking pin 28 under the stress of its actuating spring 29.

The locking plunger or piston 25 is normally under the control of a spring 32, Fig. 2, which acts upon the plunger or piston to maintain it in locking position. Mounted on the locking plunger or piston 25, is the seat 33 against which one end of the spring 32 bears, and through which the locking plunger or piston is normally held in locking position. When in such locking position the seat 33 rests upon a washer 34 mounted upon a shoulder 35 of the portion 13, the construction being such that when the locking plunger 25 is thus held in locking position, the seat or collar 33 rests upon the washer 34, but when the air pressure in the valve chamber 14 has become sufficiently great to move the locking plunger or piston 25 against the stress of the spring 32, the said locking plunger or piston moves downward or to the left, Fig. 2, thereby moving the seat or collar 33 from the washer 34 and at the same time withdrawing the locking pin 28 from its locking position. When the parts are in locking position, as indicated in Figs. 2 and 3, the end portion of the pin 28 rests in front of the head 16 of the relief valve, as indicated, and since at such times the seat 33 upon which the spring 32 acts, is resting against the washer 34, it follows that the light spring 29 of the locking pin alone forces the pin and holds it in locking position. After the locking pin has been withdrawn from its locking position, substantially as hereinbefore noted, and the relief valve has moved to its dotted line position, as indicated in Fig. 3, the air or fluid pressure in the valve chamber falls, at which time the head 16 of the relief valve is substantially in the position indicated by dotted lines, Fig. 3, so that as the locking plunger or air piston 25 returns to the right, Fig. 3, under the action of its spring 32, the end of the locking pin 28 will meet the peripheral or cylindrical surface of the head 16 of the relief valve and will be held against the head only by the pressure of the light spring 29.

In order that the locking pin 28 may not be unduly influenced by the air pressure in the valve chamber, the said locking pin is formed with an axial opening 36, Fig. 3, whereby the air pressure upon the locking pin is balanced.

The locking plunger or piston 25 may be provided with the packing 37 to force an air-tight joint between the piston and the walls of the chamber in which it moves, and such packing may be appropriately held in place by the flange 38 on the plunger or piston 25.

It will be clear to those familiar with mechanical matters that the details of the locking plunger or piston and the mounting of the locking pin yieldingly with relation to the said plunger or piston may be varied, but the particulars of construction as hereinbefore described, are found to be a good, practical, and convenient form of construction.

The action of the spring 32 upon the locking plunger or piston 25 will vary, of course, in accordance with the size of the spring in cross section, the uses to which it may have been put, the number of coils thereof, and numerous other factors. Indeed, springs of this character, even when supplied from the same source, will vary in strength, and yet it is desirable that when the spring is assembled in the controller, as herein described, it shall have a proper and uniform action upon the locking plunger or piston in accordance with the scale provided. As one means to this end, there is provided a block 39, Fig. 2, having spiral grooves 40 adapted to engage the coils of the spring 32, which normally hold said block from any turning movement relative thereto. The block 39, however, is provided with a notch 41, by which the block may be turned under the action of a suitable tool, such as a screwdriver or the like, before the spring adjusting device, to be presently described, is assembled therewith. Such preliminary turning movement of the block 39 will obviously have the effect of traveling the block toward or from the end of the spring and consequently varying the number of spring coils that shall act between the block and locking plunger or piston to maintain the latter in locking position. Thus, if the particular spring employed is of relatively great strength, obviously, the number of coils thereof that should act upon the locking plunger or piston should be increased if the established scale is to be employed, and, conversely, if the spring is relatively weak, the number of active coils should be decreased. By turning the block, as described, in the appropriate direction, the proper number of active coils of the spring may be secured in accordance with the strength of the spring and as required by the established scale.

Surrounding the spring and locking plunger hereinbefore described, is a casing 42 which may be appropriately connected to the portion 13 of the head and be provided at its opposite end with a closing disk or portion 43.

The block 39 having been preliminarily adjusted as required for the particular strength of spring, it is then necessary to adjust the tension of the spring to the desired pressure to be transmitted to the receptacle or tire to be inflated; and to this end, the casing 42 has adjustably connected thereto, a spring adjusting device, and between the casing and said device, there is provided a gauge to indicate the number of pounds pressure to which the spring has been adjusted. As one form of means for carrying this feature of the invention into effect, the adjusting device for the spring 32 is formed as a screw having differential portions, the portion 44 thereof being of coarse pitch and threaded through the end portion 43 of the casing 42 and the part 45 thereof being of finer pitch and of smaller diameter, and threaded through the block 39, the construction being such that upon turning movement of the adjusting device comprising the screw portions 44 and 45, the block 39 will be moved longitudinally in appropriate direction to adjust the spring to the desired air pressure, the amount of movement of the block being a differential movement dependent upon the pitch of the screws 44 and 45, respectively. Such differential adjustment of the block 39 to vary the spring tension has been found efficient and convenient in practice, and is especially desirable when certain character of springs are employed, but it is not necessary in all cases.

As an appropriate means for turning the screws 44 and 45, the latter is provided with a hand-piece or cap 46 which may be secured to the end of the screw portion 44 by appropriate means, such as the set screws 47; and extending longitudinally of the casing 42 from the cap 46 is the sleeve 48, which, as the screws are turned by the hand-piece 46, will travel over the scale 49 and indicate thereby, the degree of air pressure that will be transmitted to the receptacle or tire to be inflated and to which the spring has been adjusted.

Automobile tires are usually blown up or inflated to a predetermined amount, dependent upon the size and character of the tire itself. It is therefore desirable that means be provided in a device of this character to prevent accidental overinflation. This is particularly so when inflating tires at night; and the present invention contemplates, among other things, the provision of means for preventing accidental overinflation. This means is preferably in the form of a setting device which, when once set, or adjusted, limits the degree of pressure that can be transmitted to the receptacle or tire.

Figures 4, 5:
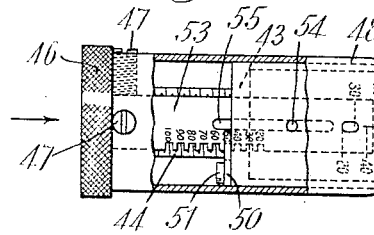
Fig. 4 is a cross section on the line 4—4, Fig. 2.
Fig. 5 is an end view looking in the direction of the arrow, Fig. 3, with the end or pressure adjusting cap removed.

The form of such device may be varied, of course, but that in the present illustration, comprises a setting pawl 50, Figs. 3, 4, and 5, pivotally mounted at 51 on the end portion 43 of the casing 42 and having a notched end part 52 adapted to engage in any one of a series of notches in a longitudinally-extending plate 53. This plate 53 is guided for longitudinal movement of the casing 42 by means of a pin 54 engaging a slot 55 in the plate 53. When the plate 53 has been adjusted to its desired position, as determined by the amount of pressure required for the tire or other receptacle, and as indicated by the scale on the plate 53, as shown by Fig. 3, the setting pawl 50 is turned down into locking engagement with the recesses in the edge of the plate 53, and thereafter the plate is held in fixed position projecting a fixed distance from the end portion 43 of the casing 42. From this construction, it will be apparent that when the adjusting device is actuated by turning the hand-piece 46, to increase the tension of the spring 32, the interior surface of the hand-piece 46 will abut against the end portion 56 of the plate 53 when the tension of the spring has been raised or adjusted to the predetermined point, and further movement of the hand-piece 46 longitudinally of the casing 42 is precluded. When it is desired to reset the setting device, the hand-piece 46, together with its sleeve 48, is removed, the setting pawl 50 is turned outward, the plate 53 moved longitudinally to position in accordance with the pressure desired, and then the setting pawl 50 is turned down into locked position again and the hand-piece 46 and its connected sleeve replaced.

Various changes may be made in some of the details hereinbefore described as comprising the present invention, and some features of the invention may be used either with or without the remainder; but the preferred construction embodies the concrete device as hereinbefore described.

What is claimed is:—

1. In a device of the character described, the combination of a head having a passageway for the transmission of air pressure from a source of supply to a receptacle to be supplied, a valve chamber communicating with said passageway, a relief valve for said chamber, a movable locking device, a locking pin for said valve yieldingly connected to the movable locking device and adapted to free the relief valve when the air pressure reaches a predetermined amount, and means for equalizing or balancing the air pressure on the ends of the locking pin.

2. In a device of the character described, the combination of a head having a passageway for the transmission of air pressure from a source of supply to a receptacle to be supplied, a valve chamber associated therewith, a pressure relief valve movable to and from closed position, a locking plunger or piston carrying a relatively movable pin for locking the said valve in closed position and acting automatically when the pressure in the receptacle has reached a predetermined amount to unlock said valve, and means for equalizing or balancing the air pressure on the ends of the locking pin.

3. In a device of the character described, the combination of a head having an air passage for the transmission of air pressure from a source of supply to a receptacle to be supplied, a valve chamber associated therewith, a pressure relief valve movable to and from closed position, a locking plunger or piston carrying a relatively movable pin for locking the said valve in closed position and acting automatically when the pressure in the receptacle has reached a predetermined amount to unlock said valve, means for limiting the relative movement of the locking plunger or piston and locking pin, and means for equalizing or balancing the air pressure on the ends of the locking pin.

4. In a pressure transmitting controller, the combination of a head having an air passage, a valve in said passage permitting the transmission of air pressure from a source of supply to a receptacle to be supplied, a valve chamber and air pressure relief valve, a locking plunger or piston, and a locking pin movable with and independently of the plunger or piston and adapted to lock the relief valve in closed position until a predetermined air pressure has been reached and to then automatically unlock the relief valve and permit it to move to open position, said pin having a passageway for air for balnacing the pressure on opposite ends of the pin.

5. In a device of the character described, the combination of a head having a passageway for the transmission of air pressure from a source of supply to a receptacle to be supplied, a valve chamber associated therewith, a pressure relief valve movable to and from closed position, a locking plunger or piston having a longitudinal opening therein, a locking pin movable longitudinally in said opening and adapted to positively lock the relief valve in closed position until a predetermined air pressure has been reached and to then automatically unlock the relief valve, and means normally acting to project the locking pin, and means for balancing the air pressure on the ends of the locking pin.

6. In a pressure transmitting controller, the combination of a head having an air passage for the transmission of air pressure from a source of supply to a receptacle to be supplied, a valve chamber and relief valve associated therewith, a locking plunger or piston having a separate locking pin carrying portion and a guiding stem portion, means for detachably connecting said two portions and a locking pin for locking the relief valve in closed position until a predetermined air pressure has been reached and then acting automatically to unlock said valve, and means for balancing the air pressure on the ends of the locking pin.

7. In a pressure transmitting controller, the combination of the head having an air pressure transmitting passage, a valve chamber communicating therewith, a relief valve in said chamber, a locking plunger or piston, a spring normally acting to move the locking plunger or piston toward locking position, a locking pin mounted in the locking plunger, yielding means acting upon the pin to project it into locking engagement with the relief valve when the latter is in closed position and to force the locking pin into light but non-locking contact with said relief valve when the latter is in open position, and means for balancing the air pressure on the ends of the locking pin.

8. In a pressure transmitting controller, the combination of a head having a passageway for the transmission of air pressure, a valve chamber communicating with said passageway, an air pressure relief valve, a locking device for the relief valve having a relatively movable locking portion for locking the valve in closed position, and means for equalizing or balancing the air pressure on the movable locking portion of the locking device.

9. In a pressure transmitting controller, the combination of a head having a passageway for the transmission of air, a valve chamber and relief valve associated therewith, a locking device for locking the relief valve in closed position, a spring for holding the locking device in locking position until a predetermined air pressure has been reached and then acting automatically to unlock the locking device, a block engaging the spring, relatively movable parts providing a scale to indicate the predetermined air pressure to which the spring is adjusted, and means for differentially moving the parts of the scale and said block as the tension of the spring is changed.

10. In a pressure transmitting controller, the combination of a head and associated air chamber and relief valve, a lock for said relief valve, a spring for holding the lock in locking position, a block for changing the tension of the spring, relatively movable parts provided with a scale to indicate the air pressure to which the spring has been adjusted, and a screw device for differentially moving the block and scale parts as the tension of the spring is changed.

11. In a pressure transmitting controller, the combination of a head having an air passage and a connected valve chamber provided with a relief valve, a locking device for locking the relief valve in closed position, a spring acting normally to move the locking device to locking position and permitting it to automatically unlock the relief valve when the air pressure has reached a predetermined amount, means for adjusting the spring for the amount of air pressure desired, and a setting device to prevent adjustment of the spring beyond the predetermined amount.

12. In a pressure transmitting controller, the combination of a head having an air passage and a connected valve chamber provided with a relief valve, a locking device for locking the relief valve in closed position, a spring acting normally to move the locking device to locking position and permitting it to automatically unlock the relief valve when the air pressure has reached a predetermined amount, a screw for adjusting the spring for the amount of air pressure at which it is desired the relief valve shall be unlocked, and a setting device to prevent screw adjustment of the spring beyond desired predetermined amount.

13. In a pressure transmitting controller, the combination of a head having an air passage for the transmission of air pressure to an automobile tire, a connected valve chamber having a relief valve, a lock for holding the relief valve in closed position and acting when a predetermined air pressure is reached to automatically unlock said valve and permit it to open, means for varying the degree of predetermined air pressure necessary to unlock the valve, and a setting device to prevent the said degree of predetermined air pressure being accidentally increased.

14. In a pressure transmitting controller for automobile tires, a head having an air passage for the transmission of air pressure from a source of supply to said tire, a relief valve for automatically relieving the air pressure in said passage when it has reached a predetermined amount, adjustable means for predeterminately varying the amount of air pressure necessary to open said relief valve, and a setting device to prevent said means from being adjusted to increase the necessary air pressure beyond the predetermined desired amount.

15. In a pressure transmitting controller for automobile tires, a head having an air passage for the transmission of air pressure from a source of supply to said tire, a relief valve for automatically relieving the air pressure in said passage when it has reached a predetermined amount, adjustable means for predeterminately varying the amount of air pressure necessary to open said relief valve, and a setting device to prevent said means from being adjusted to increase the necessary air pressure beyond the predetermined amount, said setting device comprising a setting pawl and a notched plate.

16. A pressure transmitting controller, comprising a head and connected air chamber and relief valve, a lock for said relief valve, a spring for holding the lock in locking position until a predetermined air pressure has been reached and then acting automatically to free the relief valve, a block acting upon the spring to vary the air pressure necessary to unlock the relief valve, a sleeve having a screw provided with differently threaded portions, one of which engages said block and the other of which engages a fixed part whereby upon rotation of the screw the sleeve and block are moved differentially.

17. A pressure transmitting controller, comprising a head and associated air chamber and relief valve, a lock for said relief valve, a spring for holding the lock in locking position until the air pressure has reached a predetermined amount and then acting automatically to free said valve, a block adjustably connected to said spring for varying the number of coils of the spring that shall act upon said lock, and means for adjusting the tension of the active part of said spring to vary the amount of air pressure necessary to unlock the relief valve.

In testimony whereof, I have signed my name to this specification, in the presence of two subscribing witnesses.

FRANCIS E. MILLS.

Witnesses:
BEATRICE I. SMITH,
ELLEN B. TOMLINSON.